US011908370B2

(12) United States Patent
Park et al.

(10) Patent No.: US 11,908,370 B2
(45) Date of Patent: Feb. 20, 2024

(54) METHOD OF DRIVING DISPLAY PANEL AND DISPLAY APPARATUS FOR PERFORMING THE SAME

(71) Applicant: Samsung Display Co., Ltd., Yongin-Si (KR)

(72) Inventors: Geonhwi Park, Anyang-si (KR); Hyunjoo Seo, Changwon-si (KR); Kihyun Pyun, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/109,106

(22) Filed: Feb. 13, 2023

(65) Prior Publication Data

US 2023/0316978 A1 Oct. 5, 2023

(30) Foreign Application Priority Data

Mar. 25, 2022 (KR) ........................ 10-2022-0037615

(51) Int. Cl.
*G09G 3/20* (2006.01)

(52) U.S. Cl.
CPC ......... *G09G 3/2007* (2013.01); *G09G 3/2096* (2013.01); *G09G 2320/0233* (2013.01); *G09G 2320/0276* (2013.01); *G09G 2320/0626* (2013.01); *G09G 2320/0666* (2013.01); *G09G 2360/16* (2013.01)

(58) Field of Classification Search
CPC ............... G09G 3/2096; G09G 3/2007; G09G 2360/16; G09G 2320/0233; G09G 2320/0626; G09G 2320/0666; G09G 2320/0276
See application file for complete search history.

(56) References Cited

U.S. PATENT DOCUMENTS 7,365,720 B2 * 4/2008 Bouwens ................. G09G 3/22
345/83
8,576,261 B2 * 11/2013 Yoshida ............... G09G 3/3648
345/88

(Continued)

FOREIGN PATENT DOCUMENTS

KR 10-1943419 B1 1/2019
KR 10-2061554 B1 1/2020

*Primary Examiner* — Vinh T Lam
(74) *Attorney, Agent, or Firm* — Innovation Counsel LLP

(57) ABSTRACT

A method of operating a display apparatus includes the following steps: calculating a first color reference luminance ratio, a second color reference luminance ratio, and a third color reference luminance ratio for a reference grayscale value; calculating first color target luminance ratios, second color target luminance ratios, and third color target luminance ratios for adjustment target grayscale values; generating first adjustment values, second adjustment values, and third adjustment values based on the first, second, and third color reference luminance ratios and the first, second, and third color target luminance ratios; performing gamma conversions of first, second and third colors using the first, second, and third adjustment values for the adjustment target grayscale values; using results of the gamma conversions to generate data voltages; and using the data voltage and a display panel of the display apparatus to emit or transmit light for displaying an image.

20 Claims, 12 Drawing Sheets

(56) References Cited

U.S. PATENT DOCUMENTS

| | | | | |
|---|---|---|---|---|
| 8,711,136 | B2 * | 4/2014 | Park | G09G 3/3233 345/204 |
| 8,947,476 | B2 * | 2/2015 | Yoshida | G09G 3/3648 345/694 |
| 9,058,783 | B2 * | 6/2015 | Tomizawa | G02F 1/133514 |
| 9,836,828 | B2 * | 12/2017 | Jones | G06T 3/0093 |
| 9,928,782 | B2 * | 3/2018 | Do | G09G 3/2007 |
| 9,965,989 | B2 * | 5/2018 | Chen | H04N 9/73 |
| 10,217,197 | B2 * | 2/2019 | Mantiuk | H04N 1/6027 |
| 10,460,426 | B2 * | 10/2019 | Jones | G02B 17/086 |
| 10,636,364 | B2 * | 4/2020 | Yang | G09G 3/2007 |
| 10,803,560 | B2 * | 10/2020 | Jones | G06T 15/04 |
| 10,846,832 | B2 * | 11/2020 | Mantiuk | G06T 5/007 |
| 11,074,889 | B2 * | 7/2021 | Petrie | G09G 3/20 |
| 11,302,238 | B2 * | 4/2022 | Pyo | G09G 3/2003 |
| 11,594,187 | B2 * | 2/2023 | Pyo | H10K 59/60 |
| 11,610,528 | B2 * | 3/2023 | Kim | G09G 3/006 |
| 11,688,325 | B2 * | 6/2023 | Han | G09G 3/3607 345/694 |
| 11,710,461 | B2 * | 7/2023 | Park | G09G 3/3291 345/690 |
| 11,727,871 | B2 * | 8/2023 | Pyun | G09G 3/3233 345/690 |
| 11,735,130 | B2 * | 8/2023 | Hai | G09G 3/3607 345/690 |
| 11,756,471 | B2 * | 9/2023 | Pyo | G09G 3/2074 345/690 |
| 11,790,846 | B2 * | 10/2023 | Zhang | G09G 3/3233 345/690 |
| 2008/0094426 | A1 * | 4/2008 | Kimpe | G09G 3/3406 345/691 |
| 2008/0108384 | A1 * | 5/2008 | Hunt | G09G 3/2003 348/E9.051 |
| 2010/0182345 | A1 * | 7/2010 | Shimoshikiryoh | H01L 29/41733 345/211 |
| 2012/0287104 | A1 * | 11/2012 | Katsuta | G09G 3/3607 345/88 |
| 2014/0111405 | A1 * | 4/2014 | Jeong | G09G 3/3208 345/77 |
| 2017/0092181 | A1 * | 3/2017 | Nishimura | G09G 3/3696 |
| 2020/0219432 | A1 * | 7/2020 | Park | G09G 3/2003 |
| 2021/0073954 | A1 * | 3/2021 | Mantiuk | H04N 1/6005 |
| 2023/0074524 | A1 * | 3/2023 | Peng | G09G 3/2003 |

* cited by examiner

FIG. 14

| GRAYSCALE VALUE | LW | LR | LG | LB | LR+LG+LB | LR RATIO | LG RATIO | LB RATIO |
|---|---|---|---|---|---|---|---|---|
| 1 | 0.10 | 0.02 | 0.07 | 0.01 | 0.10 | 0.20 | 0.70 | 0.10 |
| 2 | 0.20 | 0.04 | 0.15 | 0.02 | 0.21 | 0.19 | 0.71 | 0.10 |
| 3 | 0.32 | 0.07 | 0.22 | 0.03 | 0.32 | 0.22 | 0.69 | 0.09 |
| 4 | 0.49 | 0.10 | 0.32 | 0.05 | 0.47 | 0.21 | 0.68 | 0.11 |
| 5 | 0.64 | 0.13 | 0.41 | 0.06 | 0.60 | 0.22 | 0.68 | 0.10 |
| 6 | 0.78 | 0.16 | 0.51 | 0.08 | 0.75 | 0.21 | 0.68 | 0.11 |
| 7 | 0.94 | 0.20 | 0.64 | 0.09 | 0.93 | 0.21 | 0.69 | 0.10 |
| 8 | 1.11 | 0.24 | 0.78 | 0.11 | 1.13 | 0.21 | 0.69 | 0.10 |
| 12 | 2.14 | 0.48 | 1.57 | 0.20 | 2.25 | 0.21 | 0.70 | 0.09 |
| 16 | 3.62 | 0.79 | 2.71 | 0.34 | 3.84 | 0.21 | 0.71 | 0.09 |
| 255 | 991.46 | 196.68 | 706.50 | 66.54 | 969.72 | 0.20 | 0.73 | 0.07 |

FIG. 15

LUT1

| GRAYSCALE VALUE | RV1 | GV1 | BV1 |
|---|---|---|---|
| 1 | 1065 | 1005 | 994 |
| 2 | 1138 | 1069 | 1042 |
| 3 | 1208 | 1131 | 1092 |
| 4 | 1269 | 1184 | 1142 |
| 5 | 1327 | 1235 | 1190 |
| 6 | 1383 | 1283 | 1236 |
| 7 | 1438 | 1331 | 1281 |
| 8 | 1493 | 1378 | 1327 |
| 9 | 1548 | 1426 | 1372 |
| 10 | 1603 | 1473 | 1417 |
| 11 | 1658 | 1521 | 1462 |
| 12 | 1714 | 1569 | 1508 |
| 13 | 1771 | 1617 | 1553 |
| 14 | 1829 | 1665 | 1599 |
| 15 | 1887 | 1714 | 1645 |
| 16 | 1945 | 1763 | 1691 |

FIG. 16

LUT2

| GRAYSCALE VALUE | RV2 | GV2 | BV2 |
|---|---|---|---|
| 1 | 1065 | 1048 | 696 |
| 2 | 1198 | 1099 | 729 |
| 3 | 1098 | 1197 | 849 |
| 4 | 1209 | 1271 | 727 |
| 5 | 1206 | 1326 | 833 |
| 6 | 1317 | 1377 | 787 |
| 7 | 1370 | 1408 | 897 |
| 8 | 1422 | 1458 | 929 |
| 9 | 1475 | 1510 | 990 |
| 10 | 1529 | 1564 | 1044 |
| 11 | 1583 | 1618 | 1098 |
| 12 | 1632 | 1636 | 1173 |
| 13 | 1691 | 1691 | 1211 |
| 14 | 1746 | 1745 | 1265 |
| 15 | 1800 | 1800 | 1279 |
| 16 | 1852 | 1813 | 1315 |

METHOD OF DRIVING DISPLAY PANEL AND DISPLAY APPARATUS FOR PERFORMING THE SAME

CROSS-REFERENCE TO RELATED APPLICATION

This application claims priority under 35 U.S.C. § 119 to Korean Patent Application No. 10-2022-0037615 filed on Mar. 25, 2022 in the Korean Intellectual Property Office KIPO; the Korean Patent Application is incorporated by reference.

BACKGROUND

1. Field

The technical field is related to a method of driving a display panel and a display apparatus for performing the method.

2. Description of the Related Art

Generally, a display apparatus includes a display panel and a display panel driver. The display panel displays an image based on input image data. The display panel includes a plurality of gate lines, a plurality of data lines, and a plurality of pixels. The display panel driver includes a gate driver, a data driver, and a driving controller. The gate driver outputs gate signals to the gate lines. The data driver outputs data voltages to the data lines. The driving controller controls the gate driver and the data driver.

The driving controller may operate a luminance and color adjustment based on a target gamma value and target color coordinates. When the luminance and color adjustment is performed, the color coordinate may be shifted in a low grayscale range due to different luminous efficiencies of the display panel for different grayscale values.

When the color coordinate is shifted, color coordinates in a high grayscale range may be different from color coordinates in the low grayscale range. As a result, the display quality of the display panel may be unsatisfactory.

SUMMARY

Embodiments may be related to a method of operating a display apparatus that includes a display panel. The method may prevent an unwanted color coordinate shift in a low grayscale range during a gamma conversion.

Embodiments may be related to the display apparatus.

An embodiment may be related to a method of operating a display apparatus that includes a display panel. The method includes calculating a ratio (a first color reference luminance ratio) of a first color luminance to a total color luminance, a ratio (a second color reference luminance ratio) of a second color luminance to the total color luminance and a ratio (a third color reference luminance ratio) of a third color luminance to the total color luminance in a reference grayscale value, calculating a ratio (a first color target luminance ratio) of a first color luminance to a total color luminance, a ratio (a second color target luminance ratio) of a second color luminance to the total color luminance and a ratio (a third color target luminance ratio) of a third color luminance to the total color luminance in a compensation target grayscale value, generating a first color compensation value based on the first color reference luminance ratio and the first color target luminance ratio, generating a second color compensation value based on the second color reference luminance ratio and the second color target luminance ratio, generating a third color compensation value based on the third color reference luminance ratio and the third color target luminance ratio, operating a gamma conversion of a first color using the first color compensation value for the compensation target grayscale value, operating a gamma conversion of a second color using the second color compensation value for the compensation target grayscale value and operating a gamma conversion of a third color using the third color compensation value for the compensation target grayscale value.

The compensation target grayscale value may be equal to or greater than a grayscale level of 1 and equal to or less than a compensation limit grayscale value.

The compensation limit grayscale value may be less than a half of a maximum grayscale value.

The reference grayscale value may be a maximum grayscale value.

The first color compensation value may be determined as (the first color reference luminance ratio)/(the first color target luminance ratio) for the compensation target grayscale value. The second color compensation value may be determined as (the second color reference luminance ratio)/(the second color target luminance ratio) for the compensation target grayscale value. The third color compensation value may be determined as (the third color reference luminance ratio)/(the third color target luminance ratio) for the compensation target grayscale value.

The first color may be red. The second color may be green. The third color may be blue.

The second color compensation value may be greater than 1. The third color compensation value may be less than 1. The first color compensation value may be greater than 1 for a first compensation target grayscale value and less than 1 for a second compensation target grayscale value.

The second compensation target grayscale value may be greater than the first compensation target grayscale value. The first compensation target grayscale value may include a grayscale level of 1 and the second compensation target grayscale value may include a grayscale level of 16.

The method may further include operating the gamma conversion of the first color without applying the first color compensation value for a normal grayscale value which is not the compensation target grayscale value, operating the gamma conversion of the second color without applying the second color compensation value for the normal grayscale value and operating the gamma conversion of the third color without applying the third color compensation value for the normal grayscale value.

The total color luminance in the reference grayscale value may be a sum of the first color luminance, the second color luminance and the third color luminance in the reference grayscale value.

The total color luminance in the compensation target grayscale value may be a sum of the first color luminance, the second color luminance and the third color luminance in the compensation target grayscale value.

The total color luminance in the reference grayscale value may be a white luminance in the reference grayscale value.

The total color luminance in the compensation target grayscale value may be a white luminance in the compensation target grayscale value.

The method may further include generating a lookup table including a first color voltage code, a second color voltage code and a third color voltage code corresponding to input grayscale value based on a target gamma value, a target color coordinates, the first color compensation value, the second color compensation value and the third color compensation value.

The method may further include generating a first lookup table including a first color voltage code, a second color voltage code and a third color voltage code corresponding to input grayscale value based on a target gamma value and a target color coordinates and generating a second lookup table by applying the first color compensation value, the second color compensation value and the third color compensation value to the first lookup table.

A gamma conversion may be operated using the first lookup table in a first mode. A gamma conversion may be operated using the second lookup table in a second mode.

An embodiment may be related to a display apparatus. The display apparatus includes a display panel, a driving controller and a data driver. The driving controller is configured to generate a data signal based on input image data. The data driver is configured to convert the data signal to a data voltage and to output the data voltage to the display panel. The driving controller is configured to operate a gamma conversion of a first color, a gamma conversion of a second color and a gamma conversion of a third color using a first color compensation value, a second color compensation value and a third color compensation value which are generated based on a ratio (a first color reference luminance ratio) of a first color luminance to a total color luminance, a ratio (a second color reference luminance ratio) of a second color luminance to the total color luminance and a ratio (a third color reference luminance ratio) of a third color luminance to the total color luminance in a reference grayscale value and a ratio (a first color target luminance ratio) of a first color luminance to a total color luminance, a ratio (a second color target luminance ratio) of a second color luminance to the total color luminance and a ratio (a third color target luminance ratio) of a third color luminance to the total color luminance in a compensation target grayscale value.

The first color compensation value may be determined as (the first color reference luminance ratio)/(the first color target luminance ratio) for the compensation target grayscale value. The second color compensation value may be determined as (the second color reference luminance ratio)/(the second color target luminance ratio) for the compensation target grayscale value. The third color compensation value may be determined as (the third color reference luminance ratio)/(the third color target luminance ratio) for the compensation target grayscale value.

The driving controller may be configured to operate the gamma conversion of the first color, the gamma conversion of the second color and the gamma conversion of the third color using a lookup table generated based on a target gamma value, a target color coordinates, the first color compensation value, the second color compensation value and the third color compensation value, the lookup table including a first color voltage code, a second color voltage code and a third color voltage code corresponding to input grayscale value.

The driving controller may be configured to operate the gamma conversion of the first color, the gamma conversion of the second color and the gamma conversion of the third color based on a first lookup table, a second lookup table and a mode signal selecting one of the first lookup table and the second lookup table. The first lookup table may be generated based on a target gamma value and a target color coordinates, the first lookup table including a first color voltage code, a second color voltage code and a third color voltage code corresponding to input grayscale value. The second lookup table may be generated by applying the first color compensation value, the second color compensation value and the third color compensation value to the first lookup table.

An embodiment may be related to a method of operating a display apparatus. The display apparatus may include a display panel and driver set electrically connected to each other. The method may include the following steps: calculating a first color reference luminance ratio, which may be a ratio of a first color luminance value to a total color luminance value for a reference grayscale value; calculating a second color reference luminance ratio, which may be a ratio of a second color luminance value to the total color luminance value for the reference grayscale value; calculating a third color reference luminance ratio, which may be a ratio of a third color luminance value to the total color luminance value for the reference grayscale value; calculating first color target luminance ratios, which may be ratios of first color luminance values to total color luminance values for adjustment target grayscale values; calculating second color target luminance ratios, which may be ratios of second color luminance values to the total color luminance values for the adjustment target grayscale values; calculating third color target luminance ratios, which may be ratios of third color luminance values to the total color luminance values for the adjustment target grayscale values; generating first color adjustment values based on the first color reference luminance ratio and the first color target luminance ratios; generating second color adjustment values based on the second color reference luminance ratio and the second color target luminance ratios; generating third color adjustment values based on the third color reference luminance ratio and the third color target luminance ratios; performing a gamma conversion of a first color using the first color adjustment values for the adjustment target grayscale values; performing a gamma conversion of a second color using the second color adjustment values for the adjustment target grayscale values; performing a gamma conversion of a third color using the third color adjustment values for the adjustment target grayscale values; generating first data voltages using results of the gamma conversion of the first color, the gamma conversion of the second color, and the gamma conversion of the third color; and emitting or transmitting first light using the display panel and the first data voltages to display a first image. At least some of the steps may be performed by the driver set.

The adjustment target grayscale values may be equal to or greater than 1 and equal to or less than an adjustment limit grayscale value.

The adjustment limit grayscale value may be less than a half of a maximum grayscale value associated with the display panel.

The reference grayscale value may be a maximum grayscale value associated with the display panel.

The first color adjustment values may be calculated by dividing the first color reference luminance ratio by the first color target luminance ratios for the adjustment target grayscale values. The second color adjustment values may be calculated by dividing the second color reference luminance ratio by the second color target luminance ratios for the adjustment target grayscale values. The third color adjustment values may be calculated by dividing the third color reference luminance ratio by the third color target luminance ratios for the adjustment target grayscale values.

The first color may be red. The second color may be green. The third color may be blue.

Each of the second color adjustment values may be greater than 1. Each of the third color adjustment values may be less than 1. A first one of the first color adjustment values may be greater than 1 for a first one of the adjustment target grayscale values. A second one of the first color adjustment values may be less than 1 for a second one of the adjustment target grayscale values.

The first one of the adjustment target grayscale values may be 1. The second one of the adjustment target grayscale values may be 16.

The method may include the following steps: performing a gamma conversion of the first color without applying the first color adjustments value for a normal grayscale value that is not one of the adjustment target grayscale values; performing a gamma conversion of the second color without applying the second color adjustment values for the normal grayscale value; and performing a gamma conversion of the third color without applying the third color adjustment values for the normal grayscale value.

The total color luminance value for the reference grayscale value may be a sum of the first color luminance value, the second color luminance value, and the third color luminance value for the reference grayscale value.

Each of the total color luminance values for the adjustment target grayscale values may be a sum of a corresponding one of the first color luminance values, a corresponding one of the second color luminance values, and a corresponding one of the third color luminance values for a corresponding one of the adjustment target grayscale values.

The total color luminance value for the reference grayscale value may be a white luminance for the reference grayscale value.

Each of the total color luminance values for the adjustment target grayscale values may be a white luminance for a corresponding one of the adjustment target grayscale values.

The method may include generating a lookup table including first color voltage codes, second color voltage codes, and third color voltage codes corresponding to input grayscale values based on at least the first color adjustment values, the second color adjustment values, and the third color adjustment values.

The method may include the following steps: generating a first lookup table including first color voltage codes, second color voltage codes, and third color voltage codes corresponding to input grayscale values based on a target gamma value and target color coordinates; and generating a second lookup table by applying the first color adjustment values, the second color adjustment values, and the third color adjustment values to the first lookup table.

The method may include the following steps: performing a first gamma conversion using the first lookup table in a first mode; performing a second gamma conversion using the second lookup table in a second mode; generating second data voltages using results of at least the second gamma conversion; and emitting or transmitting second light using the display panel and the second data voltages to display a second image.

An embodiment may be related to a display apparatus. The display apparatus may include a display panel, a driving controller, and a data driver. The driving controller may generate data signals based on input image data. The data driver may be electrically connected to each of the display panela and the driving controller, may use the data signals to generate data voltages, and may output the data voltages to the display panel. The display panel may emit or transmit light using the data voltage to display an image. The driving controller may perform a gamma conversion of a first color, a gamma conversion of a second color, and a gamma conversion of a third color for generating the data signals using first color adjustment values, second color adjustment values, and third color adjustment values that are generated based on a first color reference luminance ratio, a second color reference luminance ratio, a third color reference luminance ratio, first color target luminance ratios, second color target luminance ratios, and third color target luminance ratios, which may be respectively a ratio of a first color luminance value to a total color luminance value for a reference grayscale value, a ratio of a second color luminance value to the total color luminance value for the reference grayscale value, a ratio of a third color luminance value to the total color luminance value for a reference grayscale value, ratios of first color luminance values to total color luminance values for adjustment target grayscale values, ratios of second color luminance values to the total color luminance values for the adjustment target grayscale values, and ratios of third color luminance values to the total color luminance values for the adjustment target grayscale values.

The first color adjustment values may be calculated by dividing the first color reference luminance ratio by the first color target luminance ratios for the adjustment target grayscale values. The second color adjustment values may be calculated by dividing the second color reference luminance ratio by the second color target luminance ratios for the adjustment target grayscale values. The third color adjustment values may be calculated by dividing the third color reference luminance ratio by the third color target luminance ratios for the adjustment target grayscale values.

The driving controller may perform the gamma conversion of the first color, the gamma conversion of the second color, and the gamma conversion of the third color using a lookup table generated based on at least the first color adjustment values, the second color adjustment values, and the third color adjustment values. The lookup table may include first color voltage codes, second color voltage codes, and third color voltage codes corresponding to input grayscale values.

The driving controller may perform the gamma conversion of the first color, the gamma conversion of the second color, and the gamma conversion of the third color based at least one of a first lookup table and a second lookup table according to a mode signal that selects the first lookup table or the second lookup table. The first lookup table may be generated based on a target gamma value and target color coordinates. The first lookup table may include first color voltage codes, second color voltage codes, and third color voltage codes corresponding to input grayscale values. The second lookup table may be generated by applying the first color adjustment values, the second color adjustment values, and the third color adjustment values to the first lookup table.

According to the method of driving the display panel and the display apparatus, the first color compensation value may be generated based on the first color reference luminance ratio and the first color target luminance ratio. The second color compensation value may be generated based on the second color reference luminance ratio and the second color target luminance ratio. The third color compensation value may be generated based on the third color reference luminance ratio and the third color target luminance ratio. The gamma conversion may be operated using the first color compensation value, the second color compensation value, and the third color compensation value for the compensation target grayscale value so that an unwanted color coordinate shift in a low grayscale range may be substantially prevented during the gamma conversion.

Because a color coordinate shift may be prevented, the color coordinates in the high grayscale range and the color coordinates in the low grayscale range may substantially coincide. Advantageously, the display quality of the display panel may be satisfactory.

BRIEF DESCRIPTION OF THE DRAWINGS

FIG. 14 is a table illustrating red luminance values; green luminance values; blue luminance values; sums of the red luminance values, the green luminance values, and the blue luminance values; red luminance ratios; green luminance ratios; and blue luminance ratios according to an embodiment.

FIG. 15 illustrates a first lookup table generated based on a target gamma value and target color coordinates and including red voltage codes, green voltage codes, and blue voltage codes corresponding to grayscale values according to an embodiment.

FIG. 16 illustrates a second lookup table generated based on the first lookup table, red compensation values, green compensation values, and blue compensation values, and including red voltage codes, green voltage codes, and blue voltage codes corresponding to grayscale values according to an embodiment.

DETAILED DESCRIPTION

Examples of embodiments are described with reference to the accompanying drawings.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "drive" may mean "control" and/or "operate." The term "driver" may mean "driver set" and/or "set of drivers." The term "compensate" may mean "adjust." The term "compensation" may mean "adjustment." The term "uniform" may mean "constant" and/or "consistent."

Figure 1:
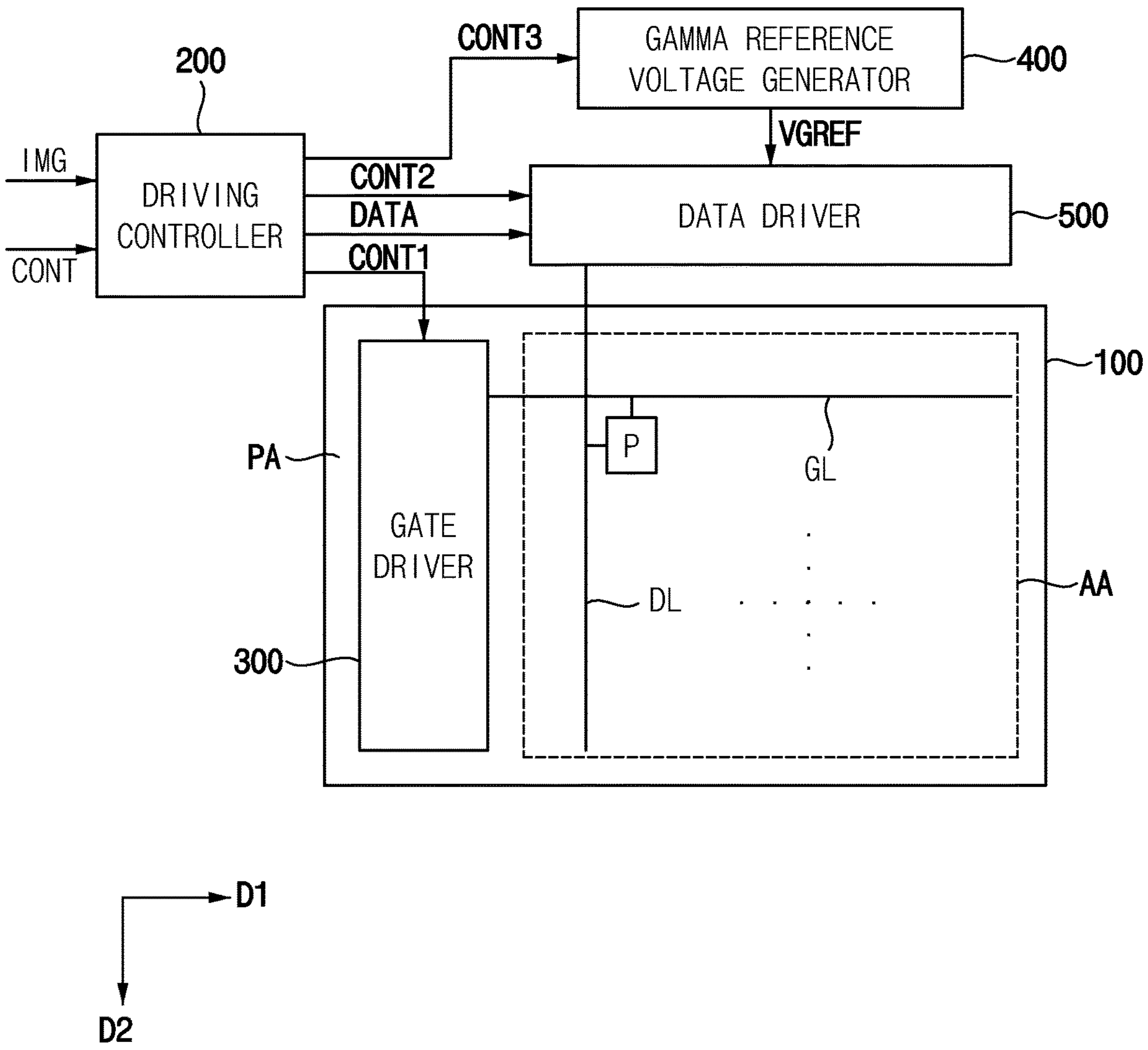
FIG. 1 is a block diagram illustrating a display apparatus according to an embodiment.

FIG. 1 is a block diagram illustrating a display apparatus according to an embodiment.

Referring to FIG. 1, the display apparatus includes a display panel 100 and a display panel driver electrically connected to each other. The display panel driver includes a driving controller 200, a gate driver 300, a gamma reference voltage generator 400, and a data driver 500.

The driving controller 200 and the data driver 500 may be integrally formed. The driving controller 200, the gamma reference voltage generator 400, and the data driver 500 may be integrally formed. A driving module including at least the driving controller 200 and the data driver 500 may be called to a timing controller embedded data driver (TED).

The display panel 100 has a display region AA for displaying an image and has a peripheral region PA adjacent to the display region AA.

The display panel 100 includes gate lines GL, data lines DL, and pixels P connected to the gate lines GL and the data lines DL. The gate lines GL may extend in a first direction D1 and may be spaced from each other in a second direction D2 different from the first direction D1. The data lines DL may extend in the second direction D2 and may be spaced from each other in the first direction D1. The pixels P may emit light or control emission of light for displaying the image.

The driving controller 200 receives input image data IMG and an input control signal CONT from an external apparatus. The input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals in response to the first control signal CONT1 received from the driving controller 200. The gate driver 300 outputs the gate signals to the gate lines GL. The gate driver 300 may sequentially output the gate signals to the gate lines GL. The gate driver 300 may be mounted on the peripheral region PA of the display panel 100. The gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

The gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

Figure 2:
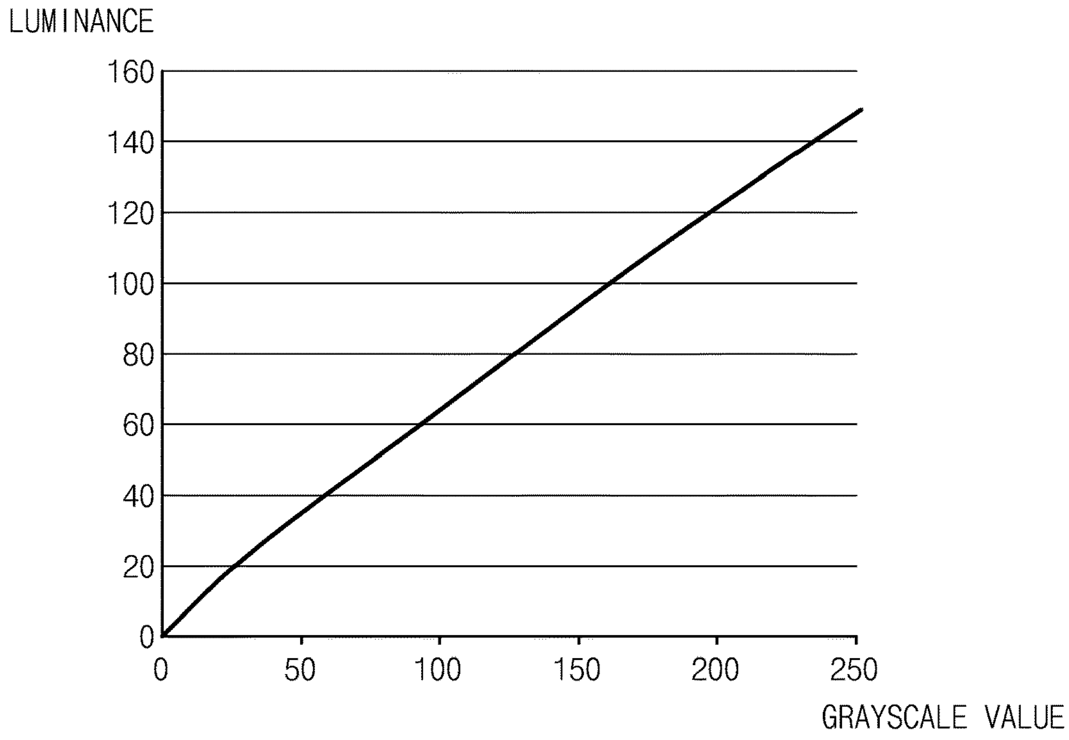
FIG. 2 is a graph illustrating luminance values according to grayscale values before a luminance and color adjustment of a driving controller of FIG. 1 according to an embodiment.
Figure 3:
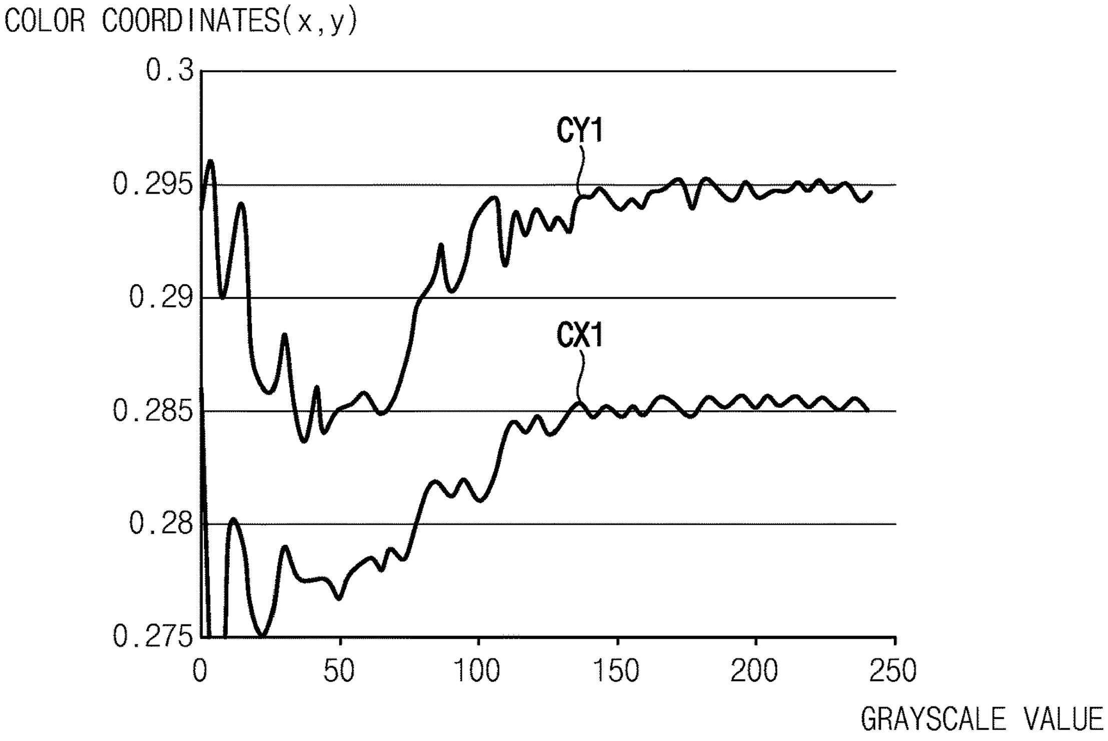
FIG. 3 is a graph illustrating color coordinates according to grayscale values before a luminance and color adjustment of the driving controller of FIG. 1 according to an embodiment.
Figure 4:
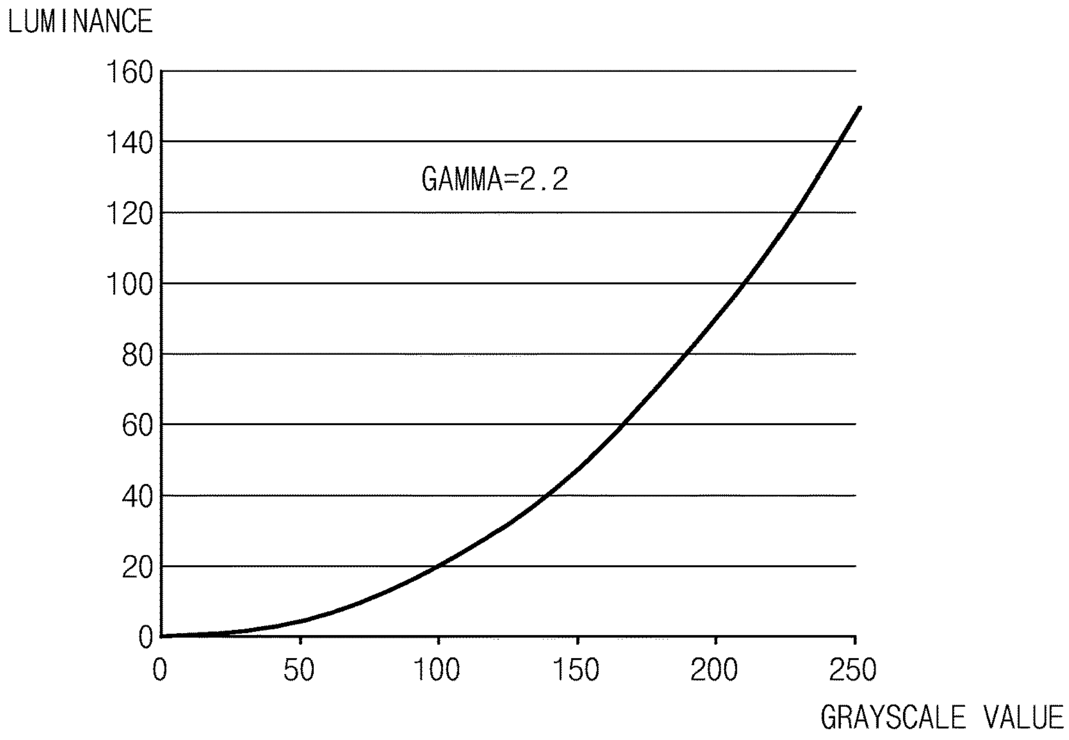
FIG. 4 is a graph illustrating ideal luminance values according to grayscale values after a luminance and color adjustment of the driving controller of FIG. 1 according to an embodiment.
Figure 5:
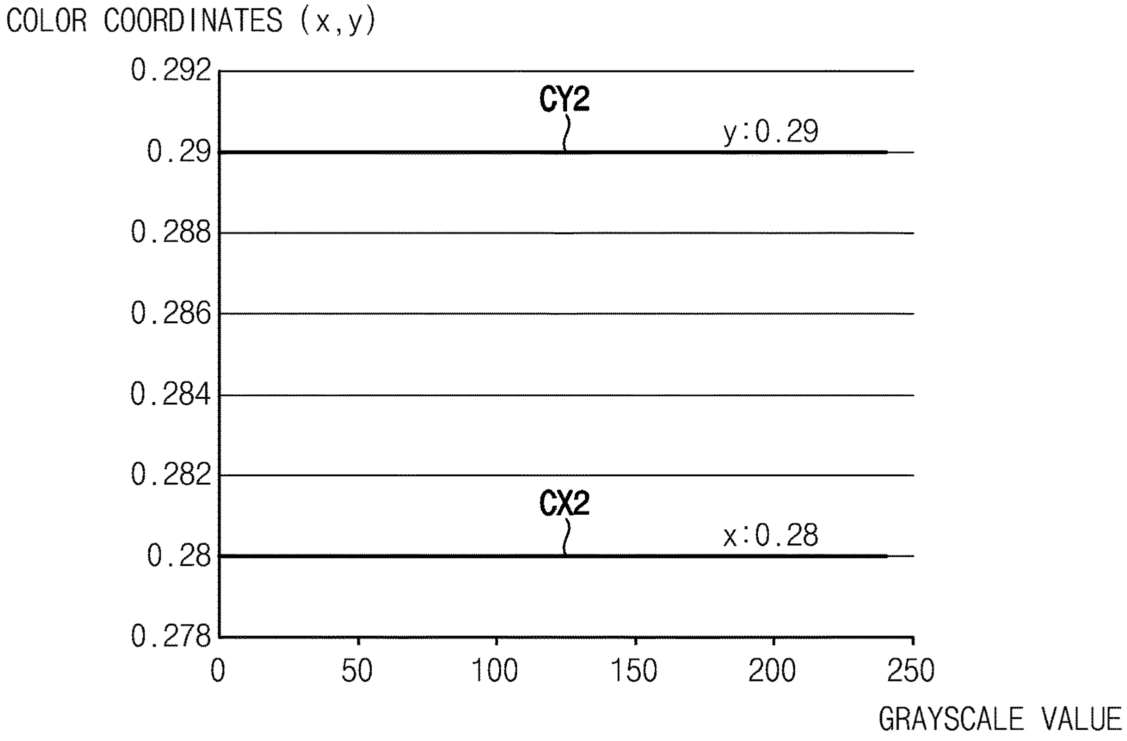
FIG. 5 is a graph illustrating ideal color coordinates according to grayscale values after a luminance and color compensation of the driving controller of FIG. 1 according to an embodiment.

FIG. 2 is a graph illustrating luminance values according to grayscale values before a luminance and color adjustment of the driving controller 200 of FIG. 1. FIG. 3 is a graph illustrating color coordinates according to the grayscale values before the luminance and color adjustment of the driving controller 200 of FIG. 1. FIG. 4 is a graph illustrating ideal luminance values according to the grayscale values after the luminance and color adjustment of the driving controller 200 of FIG. 1. FIG. 5 is a graph illustrating ideal color coordinates according to the grayscale values after the luminance and color adjustment of the driving controller 200 of FIG. 1.

Referring to FIGS. 1 to 5, the driving controller 200 may operate the luminance and color adjustment based on a target gamma value and target color coordinates. A luminance and color adjustment may be referred to as a gamma conversion.

In FIGS. 2 to 5, the input image data IMG may include 256 grayscale values from 0 to 255, including 0, 50, 100, 150, 200, and 250.

As shown in FIG. 2, the luminance values according to the grayscale values may be represented by a generally linear graph before the gamma conversion. The luminance may linearly increase according to an increase of the grayscale value.

When the gamma conversion of the driving controller 200 is operated using the target gamma value of 2.2, the luminance values according to the grayscale values may be represented by a non-linear graph as shown in FIG. 4. The luminance may non-linearly increase according to an increase of the grayscale value.

As shown in FIG. 3, the color coordinates according to the grayscale values may not have a uniform value before the gamma conversion. CX1 represents x-coordinate values, and CY1 represents y-coordinate values.

When the gamma conversion of the driving controller 200 is operated using the target color coordinates (x, y) of (0.28, 0.29), each of the color coordinates according to the grayscale value may have a uniform value as shown in FIG. 5. In FIG. 5, CX2 represents an x-coordinate value, and CY2 represents a y-coordinate value. In FIG. 5, CX2 represents a value of 0.28, and CY2 represents a value of 0.29.

FIG. 5 illustrates a case in which the color adjustment is ideally performed. In an actual display panel, one or more of the color coordinates may not be uniform in the entire grayscale range even if the color adjustment is performed.

Figure 6:
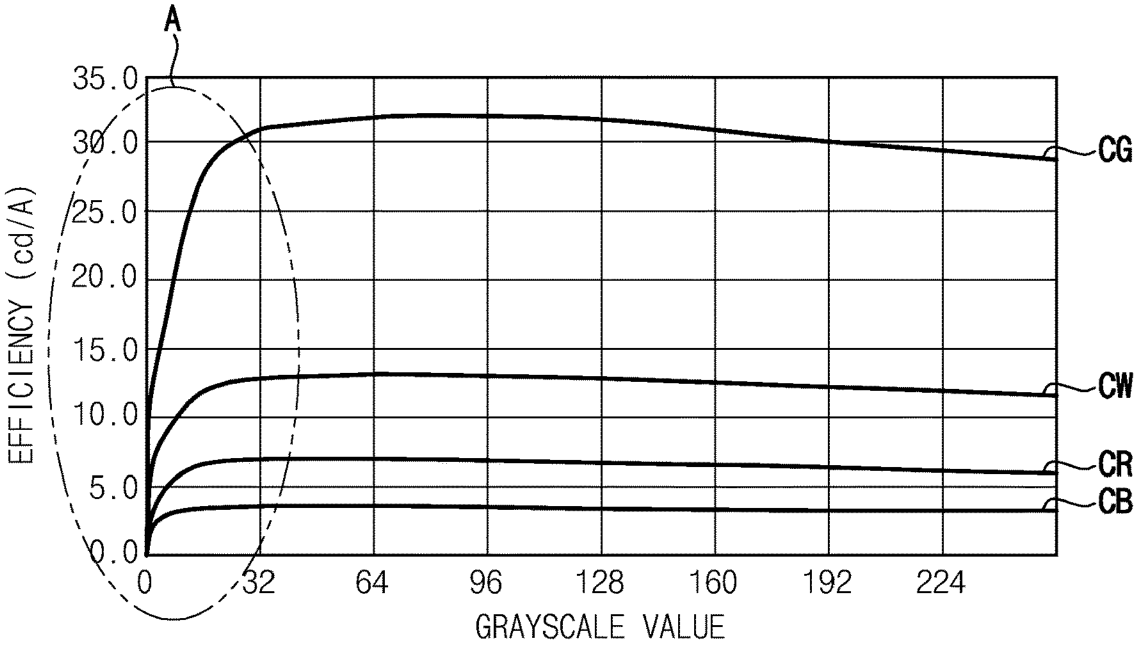
FIG. 6 is a graph illustrating luminous efficiencies of red, green, blue, and white according to grayscale values of a display panel of FIG. 1 according to an embodiment.
Figure 7:
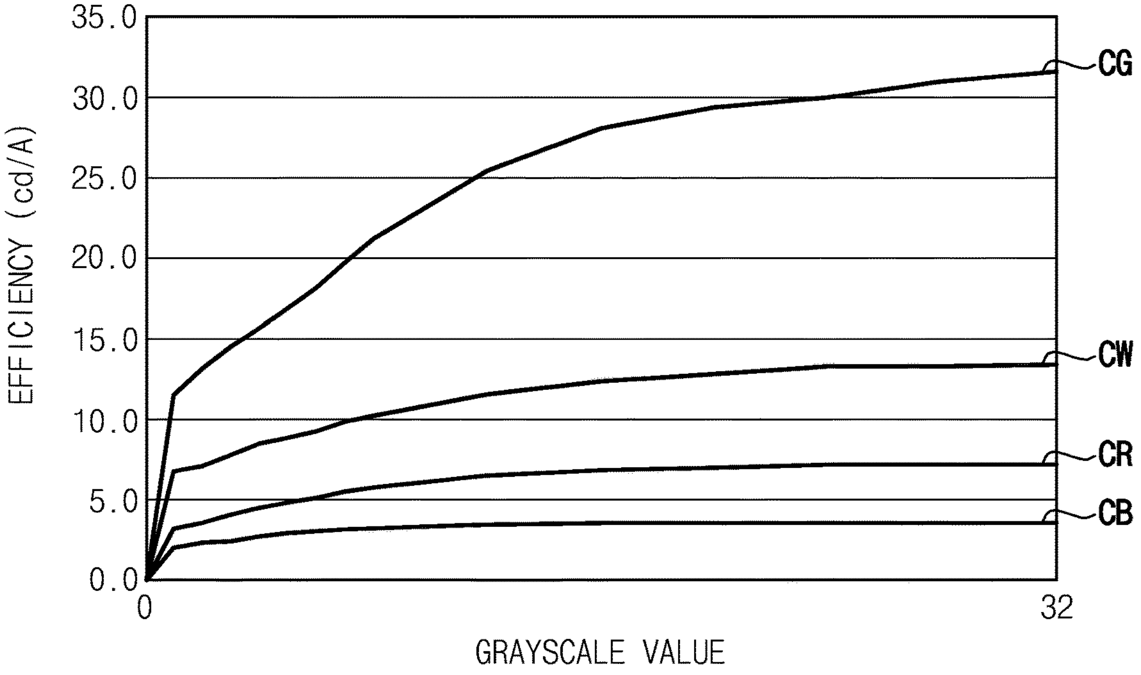
FIG. 7 is a graph illustrating a portion A of FIG. 6 according to an embodiment.
Figure 8:
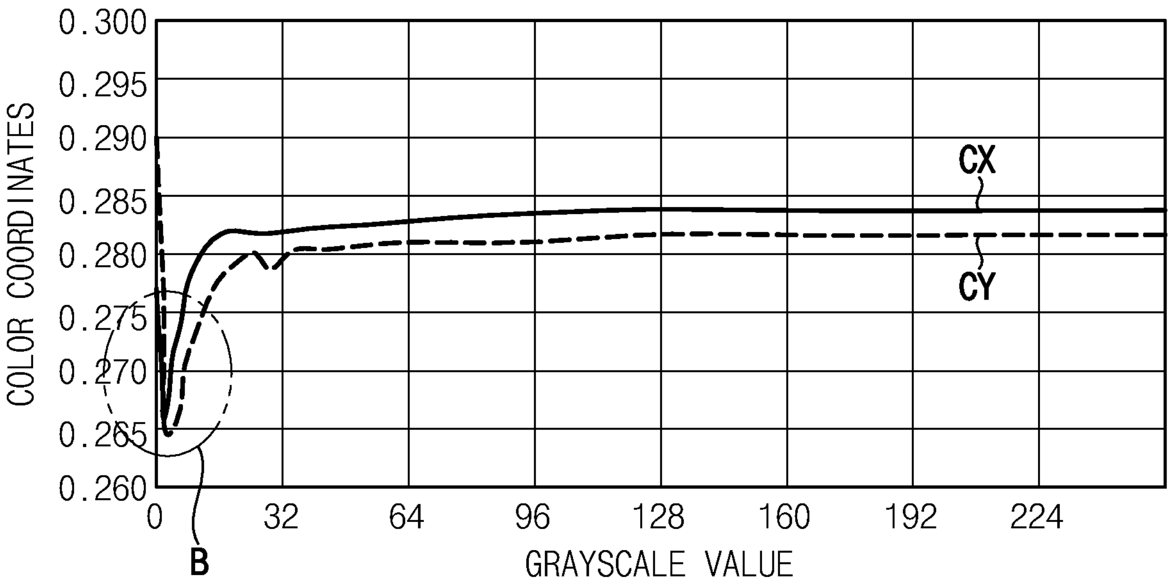
FIG. 8 is a graph illustrating practical color coordinates according to grayscale values after a luminance and color adjustment of the driving controller of FIG. 1 according to an embodiment.

FIG. 6 is a graph illustrating luminous efficiencies of red, green, blue, and white according to the grayscale values of the display panel 100 of FIG. 1. FIG. 7 is a graph illustrating a portion A of FIG. 6. FIG. 8 is a graph illustrating practical color coordinates according to the grayscale values after a luminance and color adjustment of the driving controller 200 of FIG. 1.

Referring to FIGS. 6 and 7, the red luminance efficiency values of the display panel 100 according to the grayscale values are represented by CR, the green luminance efficiency values of the display panel 100 according to the grayscale values are represented by CG, the blue luminance efficiency values of the display panel 100 according to the grayscale values are represented by CB, and the white luminance efficiency values of the display panel 100 according to the grayscale values are represented by CW. In FIGS. 6 and 7, a luminous efficiency value represents a luminous intensity according to a driving current. A unit of the luminous efficiency may be candela/ampere (cd/A).

As shown in FIGS. 6 and 7, each of the red luminous efficiency CR, the green luminous efficiency CG, the blue luminous efficiency CB, and the white luminous efficiency CW may be relatively uniform in a grayscale range equal to or greater than a grayscale level of 32. In a low grayscale range less than the grayscale level of 32, particularly in a low grayscale range less than a grayscale level of 16, each of the red luminous efficiency CR, the green luminous efficiency CG, the blue luminous efficiency CB, and the white luminous efficiency CW may not be uniform.

In the grayscale range equal to or greater than the grayscale level of 32, the green luminous efficiency CG may be greater than the red luminous efficiency CR and the blue luminous efficiency CB at respective substantially constant ratios.

In contrast, in the low grayscale range less than the grayscale level of 32, particularly in the low grayscale range less than the grayscale level of 16, a ratio of the green luminous efficiency CG to the red luminous efficiency CR or the blue luminous efficiency CB may be less than a ratio of the green luminous efficiency CG to the red luminous efficiency CR or the blue luminous efficiency CB in a high grayscale range equal to or greater than the grayscale level of 32.

For this reason, after the driving controller 200 performs the gamma conversion, the x color coordinates and the y color coordinates have substantially uniform values in the high grayscale range equal to or greater than the grayscale level of 32, but the x color coordinates and the y color coordinates may not have uniform values in the low grayscale range less than the grayscale level of 32. Particularly in the low grayscale range less than the grayscale level of 16, the x color coordinates and the y color coordinates may not have uniform values. FIG. 8 shows that the x color coordinate and the y color coordinate have relatively uniform values in the high grayscale range equal to or greater than the grayscale level of 32. FIG. 8 shows that the x color coordinate and the y color coordinate have relatively non-uniform values in the low grayscale range less than the grayscale level of 32. FIG. 8 shows that the x color coordinate and the y color coordinate have relatively non-uniform values in a portion B of FIG. 8 less than the grayscale level of 16.

If the luminous efficiency values of the display panel 100 are different for different grayscale values, the color coordinates may be shifted at a low grayscale range. When the color coordinates are shifted at the low grayscale range, the color coordinates in the high grayscale range may be substantially different from the color coordinates in the low grayscale range. If no luminance and color adjustment is performed, the display quality of the display panel 100 may be unsatisfactory.

Figure 9:
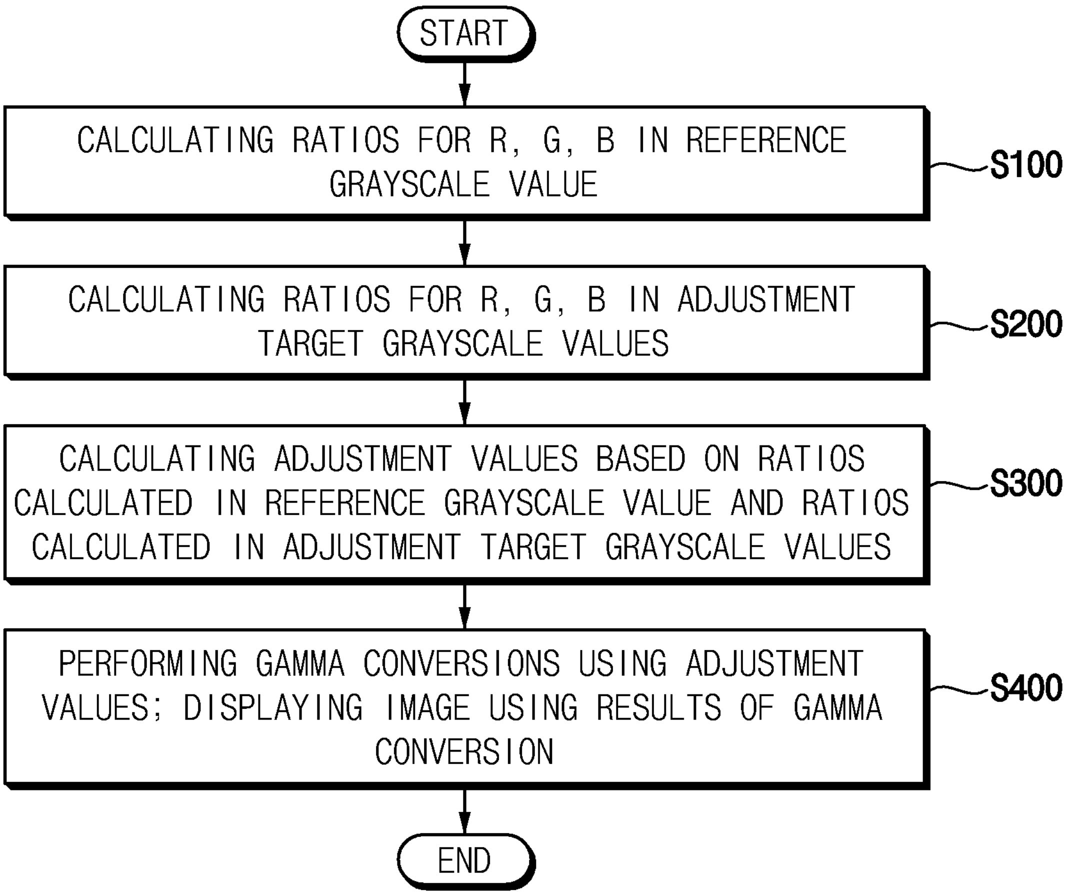
FIG. 9 is a flowchart illustrating a luminance and color adjustment of the driving controller of FIG. 1 according to an embodiment.
Figure 10:
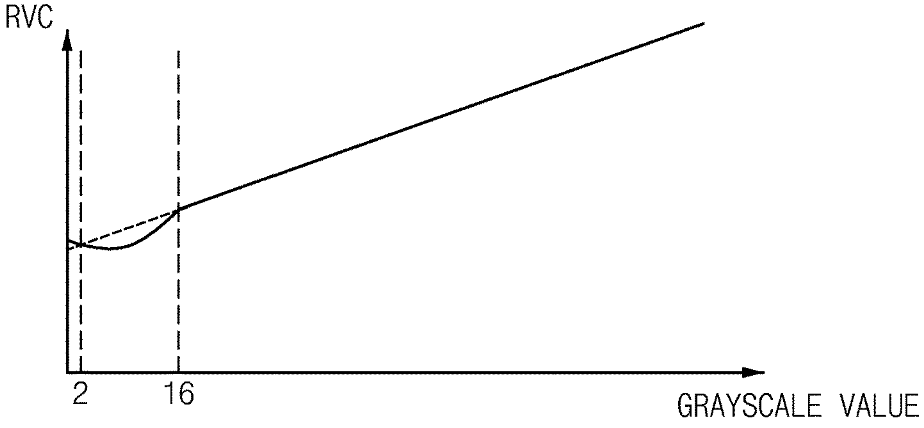
FIG. 10 is a graph illustrating red voltage codes according to grayscale values before and after a luminance and color adjustment of the driving controller of FIG. 1 according to an embodiment.
Figure 11:
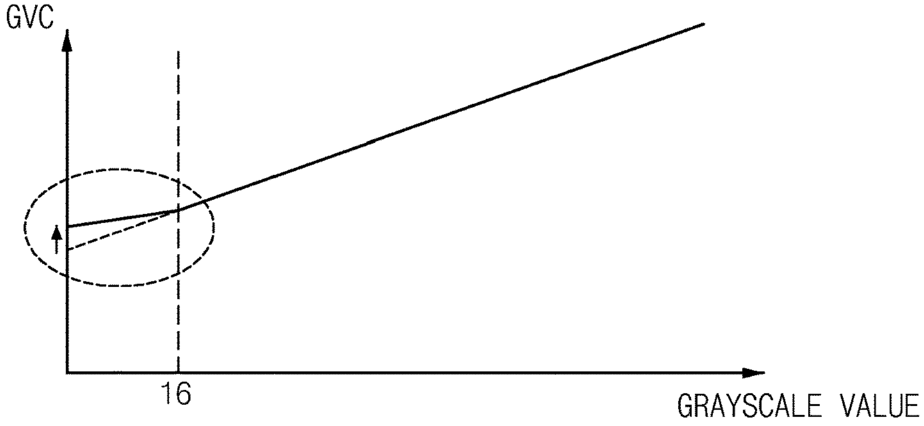
FIG. 11 is a graph illustrating green voltage codes according to grayscale values before and after a luminance and color adjustment of the driving controller of FIG. 1 according to an embodiment.
Figure 12:
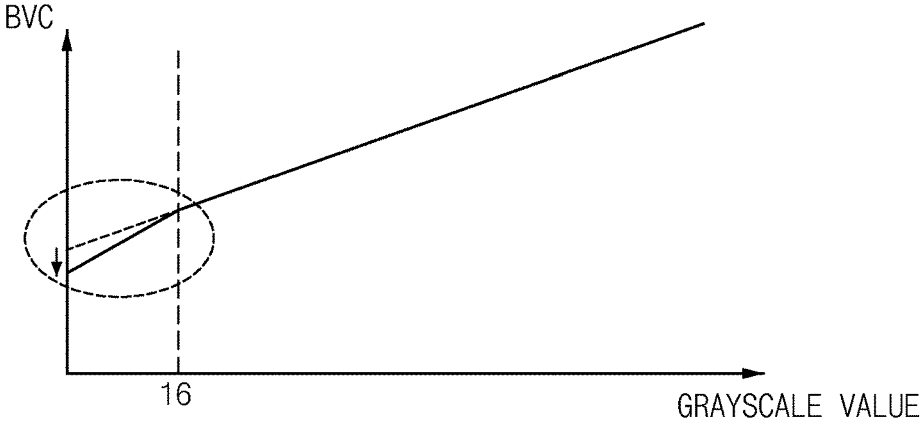
FIG. 12 is a graph illustrating blue voltage codes according to grayscale values before and after a luminance and color adjustment of the driving controller of FIG. 1 according to an embodiment.
Figure 13:
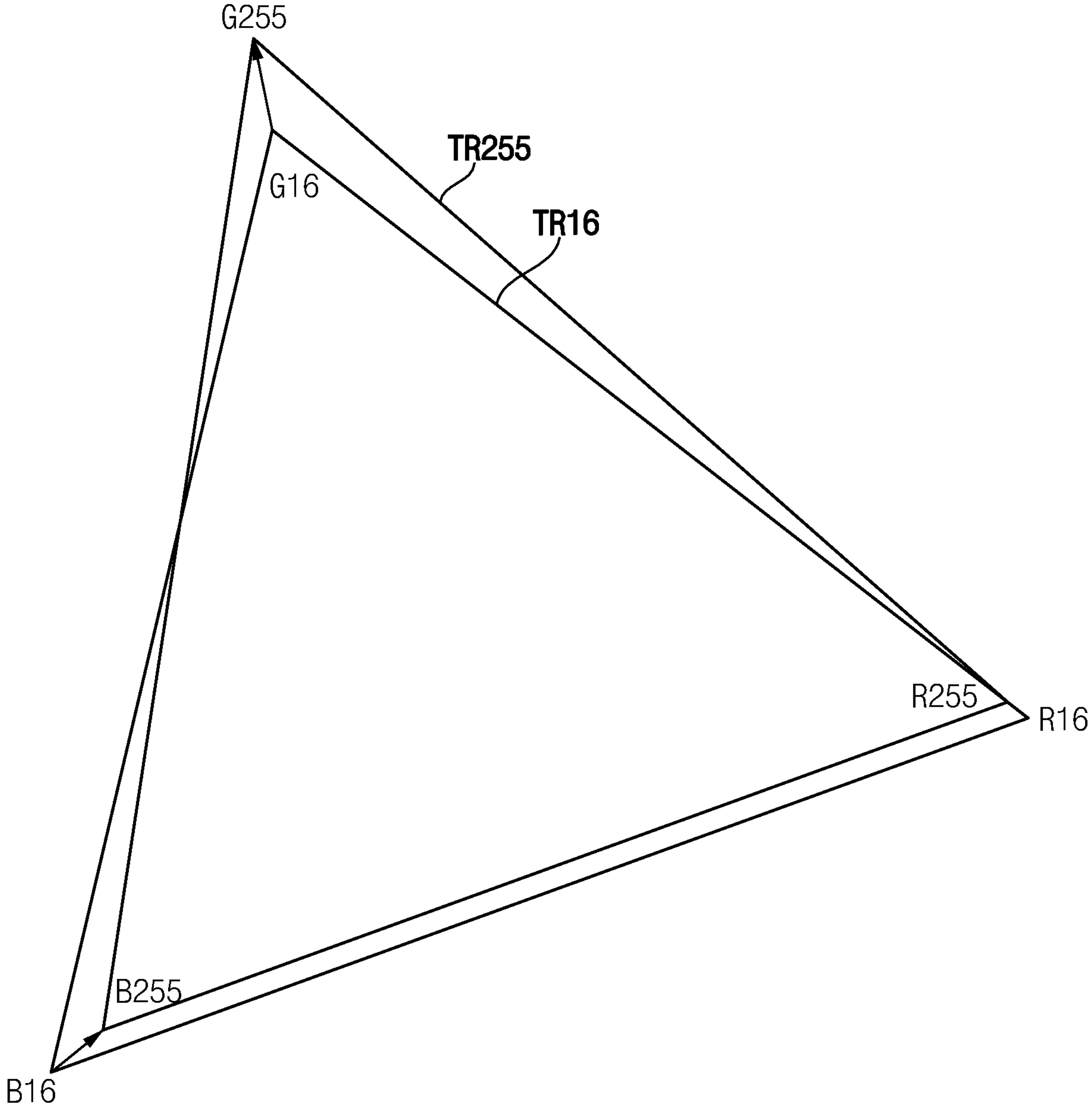
FIG. 13 is a conceptual diagram illustrating color coordinates before and after a luminance and color adjustment of the driving controller of FIG. 1 according to an embodiment.
Figure 17:
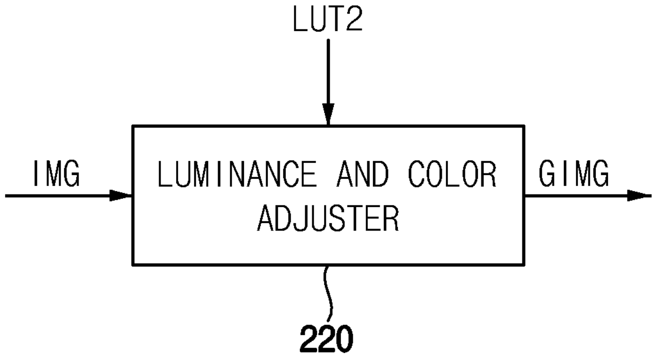
FIG. 17 is a block diagram illustrating a luminance and color adjuster of the driving controller of FIG. 1 according to an embodiment.

FIG. 9 is a flowchart illustrating the luminance and color adjustment of the driving controller 200 of FIG. 1. FIG. 10 is a graph illustrating red voltage codes according to the grayscale values before and after the luminance and color adjustment of the driving controller 200 of FIG. 1. FIG. 11 is a graph illustrating green voltage codes according to the grayscale values before and after the luminance and color adjustment of the driving controller 200 of FIG. 1. FIG. 12 is a graph illustrating blue voltage codes according to the grayscale values before and after the luminance and color adjustment of the driving controller 200 of FIG. 1. FIG. 13 is a conceptual diagram illustrating color coordinates before and after the luminance and color adjustment of the driving controller 200 of FIG. 1. FIG. 14 is a table illustrating red luminance values; green luminance values; blue luminance values; sums of the red luminance values, the green luminance values, and the blue luminance values; red luminance ratios; green luminance ratios; and blue luminance ratios. FIG. 15 illustrates a first lookup table generated based on a target gamma value and target color coordinates and including red voltage codes, green voltage codes and blue voltage codes corresponding to grayscale values. FIG. 16 illustrates a second lookup table generated based on the first lookup table, red adjustment values, green adjustment values, and blue adjustment values and including red voltage codes, green voltage codes and blue voltage codes corresponding to grayscale values. FIG. 17 is a block diagram illustrating a luminance and color adjuster 220 of the driving controller 200 of FIG. 1.

Referring to FIGS. 1 to 17, the driving controller 200 may operate a gamma conversion for a first color of the input image data IMG, a gamma conversion for a second color of the input image data IMG, a gamma conversion for a third color of the input image data IMG using a first color reference luminance ratio (which is a ratio of a first color luminance value to a total color luminance value), a second color reference luminance ratio (which is a ratio of a second color luminance value to the total color luminance value), and a third color reference luminance ratio (which is a ratio of a third color luminance value to the total color luminance value) calculated in a reference grayscale value (e.g. a grayscale level of 255); a first color target luminance ratio (which is a ratio of a first color luminance value to a total color luminance value), a second color target luminance ratio (which is a ratio of a second color luminance value to the total color luminance value), and a third color target luminance ratio (which is a ratio of a third color luminance value to the total color luminance value) calculated in an adjustment target grayscale value (e.g. a grayscale value in a range of 1 to 16); a first color adjustment value generated based on the first color reference luminance ratio and the first color target luminance ratio; a second color adjustment value generated based on the second color reference luminance ratio and the second color target luminance ratio; and a third color adjustment value generated based on the third color reference luminance ratio and the third color target luminance ratio.

The first color reference luminance ratio (LR ratio, i.e., the ratio of the first color luminance value LR to the total color luminance value (LR+LG+LB or LW)), the second color reference luminance ratio (LG ratio, i.e., the ratio of the second color luminance value LG to the total color luminance value (LR+LG+LB or LW)), and the third color reference luminance ratio (LB ratio, i.e., the ratio of the third color luminance value LB to the total color luminance value (LR+LG+LB or LW)) are calculated in the reference grayscale value (e.g. the grayscale level of 255) (operation S100).

The first color may be a red, the second color may be a green, and the third color may be a blue. The reference grayscale value may be a maximum grayscale value. When the input image data IMG includes 256 grayscale values from 0 to 255, the maximum grayscale value may be 255. The reference grayscale value may not be limited to the maximum grayscale. A grayscale value representing a desirable color coordinate may be determined as the reference grayscale value.

The total color luminance value in the reference grayscale value may be a sum (LR+LG+LB) of the first color luminance value LR, the second color luminance value LG, and the third color luminance value LB in the reference grayscale value.

The total color luminance in the reference grayscale value may be a white luminance value LW in the reference grayscale value.

The first color target luminance ratio (target LR ratio, i.e., the ratio of the first color luminance value LR to the total color luminance value (LR+LG+LB or LW)), the second color target luminance ratio (target LG ratio, i.e., the ratio of the second color luminance value LG to the total color luminance value (LR+LG+LB or LW)) and the third color target luminance ratio (target LB ratio, i.e., the ratio of the third color luminance value LB to the total color luminance value (LR+LG+LB or LW)) may be calculated in each of the adjustment target grayscale values (e.g. each of the grayscale values from 1 to 16) (operation S200).

The adjustment target grayscale value may be equal to or greater than 1 and may be equal to or less than an adjustment limit grayscale value. The adjustment limit grayscale value may mean an upper limit of the adjustment target grayscale range. The adjustment limit grayscale value may be less than a half of the maximum grayscale value. When the maximum grayscale value is 255, the adjustment limit grayscale value may be less than or equal to 127.

The adjustment limit grayscale value may be 16. The adjustment target grayscale value may be equal to or greater than 1 and may be equal to or less than 16. The adjustment target grayscale value may or may not be 0. The grayscale level of 0 represents a black grayscale level, so that the adjustment of color coordinates for the grayscale level of 0 may not be required.

The adjustment limit grayscale value may be 32. The adjustment target grayscale value may be equal to or greater than 1 and may be equal to or less than 32.

The adjustment limit grayscale value may be a grayscale level of 64. The adjustment target grayscale value may be equal to or greater than 1 and may be equal to or less than 64.

The adjustment target grayscale values for the first color target luminance ratio, the second color target luminance ratio, and the third color target luminance ratio may be equal to one another in an embodiment. The adjustment target grayscale values for the first color target luminance ratio, the second color target luminance ratio, and the third color target luminance ratio may be set unequal to one another according to color characteristics of the display panel 100. The adjustment target grayscale value of the first color may be set to a grayscale value in a range of 1 to 8, the adjustment target grayscale value of the second color may be set to a grayscale value in a range of 1 to 16, and the adjustment target grayscale value of the third color may be set to a grayscale value in a range of 1 to 32.

The total color luminance value in the adjustment target grayscale value may be a sum (LR+LG+LB) of the first color luminance value LR, the second color luminance value LG, and the third color luminance value LB in the adjustment target grayscale value.

The total color luminance value in the adjustment target grayscale value may be a white luminance value LW in the adjustment target grayscale value.

First color adjustment values may be generated based on the first color reference luminance ratios and the first color target luminance ratios for the adjustment target grayscale values. Second color adjustment values may be generated based on the second color reference luminance ratios and the second color target luminance ratios for the adjustment target grayscale values. Third color adjustment values may be generated based on the third color reference luminance ratios and the third color target luminance ratios for the adjustment target grayscale values (operation S300).

The first color adjustment values are calculated by dividing the first color reference luminance ratio by the first color target luminance ratio for each of the adjustment target grayscale values. The second color adjustment values are calculated by dividing the second color reference luminance ratio by the second color target luminance ratio for each of the adjustment target grayscale values. The third color adjustment values are calculated by dividing the third color reference luminance ratio by the third color target luminance ratio for each of the adjustment target grayscale values.

In FIG. 14, LW represents the white luminance values for grayscale values, LR represents the red luminance values for grayscale values, LG represents the green luminance values for grayscale values, and LB represents the blue luminance values for grayscale values. The unit of the white luminance values, the red luminance values, the green luminance values, and the blue luminance values in FIG. 14 may be nit. In FIG. 14, the total color luminance value is the sum (LR+LG+LB) of the first color luminance value LR, the second color luminance value LG, and the third color luminance value LB.

When the reference grayscale value is 255 and the adjustment target grayscale value is 16, the first color adjustment value is determined as (0.20)/(0.21), the second color adjustment value is determined as (0.73)/(0.71) and the third color adjustment value is determined as (0.07)/(0.09).

The gamma conversion of the first color may be operated using the first color adjustment value for the adjustment target grayscale values, the gamma conversion of the second color may be operated using the second color adjustment value for the adjustment target grayscale values and the third color may be operated using the third color adjustment value for the adjustment target grayscale values (operation S400).

The first color adjustment value of (0.20)/(0.21) may be multiplied to a first color voltage code RV1 of 1945 for the grayscale level of 16 of the first lookup table in FIG. 15 so that a first color voltage code RV2 for the grayscale level of 16 of the second lookup table in FIG. 16 may be determined to be 1852.

The second color adjustment value of (0.73)/(0.71) may be multiplied to a second color voltage code GV1 of 1763 for the grayscale level of 16 of the first lookup table in FIG. 15 so that a second color voltage code GV2 for the grayscale level 16 of the second lookup table in FIG. 16 may be determined to be 1813.

The third color adjustment value of (0.07)/(0.09) may be multiplied to a third color voltage code BV1 of 1691 for the grayscale level of 16 of the first lookup table in FIG. 15 so that a third color voltage code BV2 for the grayscale level of 16 of the second lookup table in FIG. 16 may be determined to be 1315.

For normal grayscale values which are not the adjustment target grayscale values, the gamma conversion of the first color may be operated without applying the first color adjustment value, the gamma conversion of the second color may be operated without applying the second color adjustment value, and the gamma conversion of the third color may be operated without applying the third color adjustment value. The first lookup table in FIG. 15 and the second lookup table in FIG. 16 may have the same voltage codes for a normal grayscale value which is not the adjustment target grayscale value.

The second color adjustment values may be greater than 1 for all the adjustment target grayscale values (e.g. the grayscale values 1 to 16). In the graph of FIG. 11, the voltage codes for the adjustment target grayscale values may be increased in a direction of an upward arrow of FIG. 11 using the second color adjustment values.

The third color adjustment values may be less than 1 for all the adjustment target grayscale values (e.g. the grayscale values 1 to 16). In the graph of FIG. 12, the voltage codes for the adjustment target grayscale values may be decreased in a direction of a downward arrow of FIG. 12 using the third color adjustment values.

The first color adjustment values may be greater than 1 or less than 1 for the adjustment target grayscale values (e.g. the grayscale values 1 to 16). The first color adjustment value may be greater than 1 for a first adjustment target grayscale value and may be less than 1 for a second adjustment target grayscale value. The second adjustment target grayscale value may be greater than the first adjustment target grayscale value. The first adjustment target grayscale value may be 1. The second adjustment target grayscale value may be 16. The first color adjustment value may be greater than 1 for 1 and less than 1 for the grayscale value of 16.

As shown in FIG. 13, a red point R255, a green point G255, and a blue point B255 of the grayscale value of 255 may form a triangular color space TR255 of the grayscale value of 255. A red point R16, a green point G16, and a blue point B16 of the grayscale value of 16 may form a triangular color space TR16 of the grayscale value of 16. When the lookup table shown in FIG. 15 is adjusted into the lookup table shown in FIG. 16 using the first color adjustment value, the second color adjustment value, and the third color adjustment value, the color space TR16 of the grayscale value of 16 may be transformed into substantially the same form as the color space of TR255 of the grayscale value of 255.

Referring to FIG. 17, the luminance and color adjuster 220 of the driving controller 200 may operate the luminance and color adjustment based on the lookup table LUT2 of FIG. 16. The driving controller 200 may generate gamma image data GIMG by performing a luminance and color adjustment on the input image data IMG. Referring to FIG. 17 and FIG. 1, the driving controller 200 may generate the data signal DATA based on the input image data GIMG and may provide the data signal DATA to the data driver 500. Using the data signal DATA, the data driver 500 may generate data voltages and provide the data voltages to the display panel 100. The display panel 100 may emit or transmit light according to the data voltages for displaying an image.

The lookup table LUT2 of FIG. 16 may be generated based on the target gamma value, the target color coordinates, the first color adjustment value, the second color adjustment value, and the third color adjustment value. The lookup table LUT2 of FIG. 16 may include the first color voltage code, the second color voltage code, and the third color voltage code corresponding to each of several input grayscale values.

The first color adjustment value may be generated based on the first color reference luminance ratio and the first color target luminance ratio. The second color adjustment value may be generated based on the second color reference luminance ratio and the second color target luminance ratio. The third color adjustment value may be generated based on the third color reference luminance ratio and the third color target luminance ratio. The gamma conversion may be operated using the first color adjustment value, the second color adjustment value, and the third color adjustment value for each of the adjustment target grayscale values so that an unwanted color coordinate shift in a low grayscale range may be substantially prevented during the gamma conversion.

The color coordinate shift may be substantially prevented, such that the color coordinates in the high grayscale range and the color coordinates in the low grayscale range may substantially coincide. Advantageously, the display quality of the display panel 100 may be satisfactory.

Figure 18:
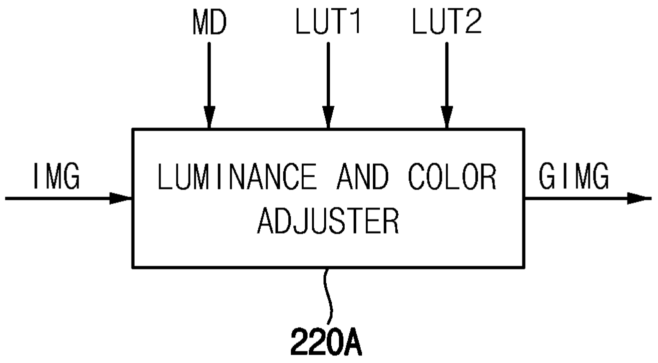
FIG. 18 is a block diagram illustrating a luminance and color adjuster of a driving controller of a display apparatus according to an embodiment.

FIG. 18 is a block diagram illustrating a luminance and color adjuster 220A of a driving controller of a display apparatus according to an embodiment.

The method of driving the display panel and the display apparatus related to FIG. 18 may include structures and features described referring to one or more FIGS. 1 to 17 except for the structure and the operation of the driving controller 200.

Referring to FIGS. 1 to 16 and 18, the display apparatus includes a display panel 100 and a display panel driver. The display panel driver includes a driving controller 200, a gate driver 300, a gamma reference voltage generator 400, and a data driver 500.

The ratio (the first color reference luminance ratio, LR ratio) of the first color luminance to the total color luminance (LR+LG+LB or LW), the ratio (the second color reference luminance ratio LG ratio) of the second color luminance to the total color luminance (LR+LG+LB or LW), and the ratio (the third color reference luminance ratio) of the third color luminance to the total color luminance (LR+LG+LB or LW) are calculated in the reference grayscale value (e.g. the grayscale value of 255) (operation S100).

The ratio (the first color target luminance ratio, LR ratio) of the first color luminance to the total color luminance (LR+LG+LB or LW), the ratio (the second color target luminance ratio, LG ratio) of the second color luminance to the total color luminance (LR+LG+LB or LW), and the ratio (the third color target luminance ratio, LB ratio) of the third color luminance to the total color luminance (LR+LG+LB or LW) may be calculated in each of the adjustment target grayscale values (e.g. each of the grayscale values from 1 to 16) (operation S200).

The first color adjustment value may be generated based on the first color reference luminance ratio and the first color target luminance ratio for each of the adjustment target grayscale values, the second color adjustment value may be generated based on the second color reference luminance ratio and the second color target luminance ratio for each of the adjustment target grayscale values, and the third color adjustment value may be generated based on the third color reference luminance ratio and the third color target luminance ratio for each of the adjustment target grayscale values (operation S300).

The gamma conversion of the first color may be operated using the first color adjustment values for the adjustment target grayscale values, the gamma conversion of the second color may be operated using the second color adjustment values for the adjustment target grayscale values, and the third color may be operated using the third color adjustment values for the adjustment target grayscale values (operation S400).

Referring to FIG. 18, the luminance and color adjuster 220A of the driving controller 200 may operate a luminance and color adjustment based on the first lookup table LUT1 of FIG. 15, the second lookup table LUT2 of FIG. 16, and a mode signal MD. The driving controller 200 may generate gamma image data GIMG by operating the luminance and color adjustment on the input image data IMG.

The first lookup table LUT1 of FIG. 15 may be generated based on the target gamma value and the target color coordinates. The first lookup table LUT1 of FIG. 15 may include the first color voltage code, the second color voltage code, and the third color voltage code corresponding to each of several input grayscale values.

The second lookup table LUT2 of FIG. 16 may be generated by applying the first color adjustment values, the second color adjustment values, and the third color adjustment value to the first lookup table LUT1.

In a first mode of the mode signal MD, the gamma conversion may be operated using the first lookup table LUT1. In a second mode of the mode signal MD, the gamma conversion may be operated using the second lookup table LUT2. The first lookup table LUT1 and the second lookup table LUT2 may be selectively applied according to the mode signal MD. The first mode may be a normal mode, and the second mode may be a low grayscale color coordinate adjustment mode.

The first color adjustment value may be generated based on the first color reference luminance ratio and the first color target luminance ratio. The second color adjustment value may be generated based on the second color reference luminance ratio and the second color target luminance ratio. The third color adjustment value may be generated based on the third color reference luminance ratio and the third color target luminance ratio. The gamma conversion may be operated using the first color adjustment value, the second color adjustment value, and the third color adjustment value for each of the adjustment target grayscale values, so that the color coordinate shift in a low grayscale range may be substantially prevented during the gamma conversion.

The color coordinate shift may be substantially prevented, so that the color coordinates in the high grayscale range and the color coordinates in the low grayscale range may substantially coincide. Advantageously, the display quality of the display panel 100 may be satisfactory.

The foregoing is illustrative and is not to be construed as limiting. Although examples of embodiments have been described, many modifications are possible in the embodiments without materially departing from the scope defined in the claims. In the claims, means-plus-function clauses may cover the structures for performing the recited function and not only structural equivalents but also equivalent structures.

What is claimed is:

1. A method of operating a display apparatus, the display apparatus comprising a display panel and driver set electrically connected to each other, the method comprising:

calculating a first color reference luminance ratio, which is a ratio of a first color luminance value to a total color luminance value for a reference grayscale value;

calculating a second color reference luminance ratio, which is a ratio of a second color luminance value to the total color luminance value for the reference grayscale value;

calculating a third color reference luminance ratio, which is a ratio of a third color luminance value to the total color luminance value for the reference grayscale value;

calculating first color target luminance ratios, which are ratios of first color luminance values to total color luminance values for adjustment target grayscale values;

calculating second color target luminance ratios, which are ratios of second color luminance values to the total color luminance values for the adjustment target grayscale values;

calculating third color target luminance ratios, which are ratios of third color luminance values to the total color luminance values for the adjustment target grayscale values;

generating first color adjustment values based on the first color reference luminance ratio and the first color target luminance ratios;

generating second color adjustment values based on the second color reference luminance ratio and the second color target luminance ratios;

generating third color adjustment values based on the third color reference luminance ratio and the third color target luminance ratios;

performing a gamma conversion of a first color using the first color adjustment values for the adjustment target grayscale values;

performing a gamma conversion of a second color using the second color adjustment values for the adjustment target grayscale values;

performing a gamma conversion of a third color using the third color adjustment values for the adjustment target grayscale values;

generating first data voltages using results of the gamma conversion of the first color, the gamma conversion of the second color, and the gamma conversion of the third color; and emitting or transmitting first light using the display panel and the first data voltages to display a first image.

2. The method of claim 1, wherein the adjustment target grayscale values are equal to or greater than 1 and equal to or less than an adjustment limit grayscale value.

3. The method of claim 2, wherein the adjustment limit grayscale value is less than a half of a maximum grayscale value associated with the display panel.

4. The method of claim 1, wherein the reference grayscale value is a maximum grayscale value associated with the display panel.

5. The method of claim 1, wherein the first color adjustment values are calculated by dividing the first color reference luminance ratio by the first color target luminance ratios for the adjustment target grayscale values, wherein the second color adjustment values are calculated by dividing the second color reference luminance ratio by the second color target luminance ratios for the adjustment target grayscale values, and wherein the third color adjustment values are calculated by dividing the third color reference luminance ratio by the third color target luminance ratios for the adjustment target grayscale values.

6. The method of claim 5, wherein the first color is red, wherein the second color is green, and wherein the third color is blue.

7. The method of claim 6, wherein each of the second color adjustment values is greater than 1, wherein each of the third color adjustment values is less than 1, wherein a first one of the first color adjustment values is greater than 1 for a first one of the adjustment target grayscale values, and wherein a second one of the first color adjustment values is less than 1 for a second one of the adjustment target grayscale values.

8. The method of claim 7 wherein the first one of the adjustment target grayscale values is 1, and wherein the second one of the adjustment target grayscale values is 16.

9. The method of claim 1, further comprising:

performing a gamma conversion of the first color without applying the first color adjustments value for a normal grayscale value that is not one of the adjustment target grayscale values;

performing a gamma conversion of the second color without applying the second color adjustment values for the normal grayscale value; and performing a gamma conversion of the third color without applying the third color adjustment values for the normal grayscale value.

10. The method of claim 1, wherein the total color luminance value for the reference grayscale value is a sum of the first color luminance value, the second color luminance value, and the third color luminance value for the reference grayscale value.

11. The method of claim 10, wherein each of the total color luminance values for the adjustment target grayscale values is a sum of a corresponding one of the first color luminance values, a corresponding one of the second color luminance values, and a corresponding one of the third color luminance values for a corresponding one of the adjustment target grayscale values.

12. The method of claim 1, wherein the total color luminance value for the reference grayscale value is a white luminance for the reference grayscale value.

13. The method of claim 12, wherein each of the total color luminance values for the adjustment target grayscale values is a white luminance for a corresponding one of the adjustment target grayscale values.

14. The method of claim 1, further comprising generating a lookup table including first color voltage codes, second color voltage codes, and third color voltage codes corresponding to input grayscale values based on at least the first color adjustment values, the second color adjustment values, and the third color adjustment values.

15. The method of claim 1, further comprising:

generating a first lookup table including first color voltage codes, second color voltage codes, and third color voltage codes corresponding to input grayscale values based on a target gamma value and target color coordinates; and generating a second lookup table by applying the first color adjustment values, the second color adjustment values, and the third color adjustment values to the first lookup table.

16. The method of claim 15, further comprising:

performing a first gamma conversion using the first lookup table in a first mode;

performing a second gamma conversion using the second lookup table in a second mode;

generating second data voltages using results of at least the second gamma conversion; and emitting or transmitting second light using the display panel and the second data voltages to display a second image.

17. A display apparatus comprising:

a display panel;

a driving controller configured to generate data signals based on input image data; and a data driver electrically connected to each of the display panela and the driving controller, configured to use the data signals to generate data voltages, and configured to output the data voltages to the display panel, wherein the display panel is configured to emit or transmit light using the data voltage to display an image, and wherein the driving controller is configured to perform a gamma conversion of a first color, a gamma conversion of a second color, and a gamma conversion of a third color for generating the data signals using first color adjustment values, second color adjustment values, and third color adjustment values that are generated based on a first color reference luminance ratio, a second color reference luminance ratio, a third color reference luminance ratio, first color target luminance ratios, second color target luminance ratios, and third color target luminance ratios, which are respectively a ratio of a first color luminance value to a total color luminance value for a reference grayscale value, a ratio of a second color luminance value to the total color luminance value for the reference grayscale value, a ratio of a third color luminance value to the total color luminance value for a reference grayscale value, ratios of first color luminance values to total color luminance values for adjustment target grayscale values, ratios of second color luminance values to the total color luminance values for the adjustment target grayscale values, and ratios of third color luminance values to the total color luminance values for the adjustment target grayscale values.

18. The display apparatus of claim 17, wherein the first color adjustment values are calculated by dividing the first color reference luminance ratio by the first color target luminance ratios for the adjustment target grayscale values, wherein the second color adjustment values are calculated by dividing the second color reference luminance ratio by the second color target luminance ratios for the adjustment target grayscale values, and wherein the third color adjustment values are calculated by dividing the third color reference luminance ratio by the third color target luminance ratios for the adjustment target grayscale values.

19. The display apparatus of claim 17, wherein the driving controller is configured to perform the gamma conversion of the first color, the gamma conversion of the second color, and the gamma conversion of the third color using a lookup table generated based on at least the first color adjustment values, the second color adjustment values, and the third color adjustment values, the lookup table including first color voltage codes, second color voltage codes, and third color voltage codes corresponding to input grayscale values.

20. The display apparatus of claim 17, wherein the driving controller is configured to perform the gamma conversion of the first color, the gamma conversion of the second color, and the gamma conversion of the third color based on at least one of a first lookup table and a second lookup table according to a mode signal that selects the first lookup table or the second lookup table, wherein the first lookup table is generated based on a target gamma value and target color coordinates, the first lookup table including first color voltage codes, second color voltage codes, and third color voltage codes corresponding to input grayscale values, and wherein the second lookup table is generated by applying the first color adjustment values, the second color adjustment values, and the third color adjustment values to the first lookup table.

* * * * *